US011578993B2

(12) United States Patent
Fontanesi et al.

(10) Patent No.: US 11,578,993 B2
(45) Date of Patent: Feb. 14, 2023

(54) DETERMINING A RELATIVE MOVEMENT DIRECTION

(71) Applicant: Infineon Technologies AG, Neubiberg (DE)

(72) Inventors: Simone Fontanesi, Villach (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 372 days.

(21) Appl. No.: 16/594,978

(22) Filed: Oct. 7, 2019

(65) Prior Publication Data
US 2020/0158535 A1   May 21, 2020

(30) Foreign Application Priority Data

Nov. 15, 2018   (DE) .................. 102018219581.1

(51) Int. Cl.
*G01D 5/14* (2006.01)
(52) U.S. Cl.
CPC ...................... *G01D 5/14* (2013.01)
(58) Field of Classification Search
CPC ...................................... G01D 5/14
See application file for complete search history.

(56) References Cited

U.S. PATENT DOCUMENTS

| 7,009,387 | B2* | 3/2006 | Guderzo | G01D 5/145 |
| | | | | 324/207.2 |
| 7,535,215 | B2* | 5/2009 | Forster | G01D 5/145 |
| | | | | 324/165 |
| 7,834,616 | B2* | 11/2010 | Stolfus | G01P 3/489 |
| | | | | 324/252 |
| 2003/0128027 | A1* | 7/2003 | Buchhold | G01P 3/488 |
| | | | | 324/207.21 |
| 2009/0012740 | A1* | 1/2009 | Hain | B60C 23/0416 |
| | | | | 702/148 |
| 2012/0133357 | A1* | 5/2012 | Fritz | G01P 3/487 |
| | | | | 324/207.24 |
| 2017/0336225 | A1 | 11/2017 | Burdette et al. | |
| 2020/0080867 | A1* | 3/2020 | Foletto | G01D 5/2448 |

FOREIGN PATENT DOCUMENTS

| DE | 102014216295 A1 | 2/2016 |
| DE | 102017107228 A1 | 10/2018 |
| WO | 2008094809 A2 | 8/2008 |

* cited by examiner

*Primary Examiner* — Walter L Lindsay, Jr.
*Assistant Examiner* — Milton Gonzalez
(74) *Attorney, Agent, or Firm* — Harrity & Harrity, LLP

(57) ABSTRACT

An apparatus, for determining a relative direction of a movement of an encoder object depending on a magnetic field which is generated or influenced by the encoder object. A magnetic field sensor generates two sensor signals based on the magnetic field, that indicate a profile of the magnetic field in the event of a relative movement between the encoder object and the magnetic field sensor, that fluctuate around a mean value and are phase-shifted 90° to one another. The processing circuit calculates an angle based on the two sensor signals, and determines the relative direction of the movement of the encoder object based on a gradient of the angle between a switch-on time of the apparatus and a threshold value angle which is reached thereafter or based on a gradient of the angle between the situation of two successive threshold value angles being reached.

17 Claims, 12 Drawing Sheets

DETERMINING A RELATIVE MOVEMENT DIRECTION

CROSS REFERENCE TO RELATED APPLICATIONS

This application claims priority under 35 U.S.C. § 119 to German Patent Application No. 102018219581.1 filed on Nov. 15, 2018, the contents of which are incorporated by reference herein in their entirety.

TECHNICAL FIELD

The present disclosure is concerned with apparatuses and methods for determining a relative movement direction and apparatuses and methods for determining a relative direction of a movement of an encoder object depending on a magnetic field which is generated or influenced by the encoder object.

BACKGROUND

Magnetic field sensors are used in order to measure magnetic fields. Examples of magnetic field sensors include AMR sensors (AMR=anisotropic magnetoresistance), GMR sensors (GMR=giant magnetoresistance), TMR sensors (TMR=tunnel magnetoresistance) or Hall sensors. These sensors produce an output signal which is proportional to an applied magnetic field. Magnetic field sensors are used in a large number of fields in order to detect relative movements between the magnetic field sensor and a magnet element. The magnet element can have, for example, one or more pole pairs, so that the magnetic field sensor produces an oscillation signal, which fluctuates around a mean value, in the event of a relative movement between the magnetic field sensor and the magnet element.

An example of magnetic field sensors of this kind is wheel speed sensors which detect a wheel speed. In wheel speed sensors of this kind, a pole wheel with one or a plurality of pole pairs can be arranged on an axle about which the wheel rotates, so that the pole wheel, when the wheel rotates, produces a varying magnetic field which is detected by the magnetic field sensor. Magnetic field sensors can generate, for example on the basis of the magnetic field which is generated by the pole wheel, output signals which are phase-shifted through 90° in relation to one another and on the basis of which an angle can in turn be calculated, it being possible for both the rotation speed and also the rotation direction of the pole wheel to be determined on the basis of the angle.

In general, magnetic field sensors can output an output signal in accordance with a signal protocol based on the detected signal. In the case of a so-called AK protocol (workshop protocol), a pulse sequence is generated at each zero crossing of the oscillation signal, wherein a first pulse with a first pulse height indicates the zero crossing and succeeding pulses with a second, lower height represent information bits which can indicate further information. In the case of another, so-called PWM protocol (PWM=pulse width modulation), an individual pulse is generated at each zero crossing of the oscillation signal. The width of the pulse can be modulated in order to contain information; for example, the pulses can have a first width when the wheel rotates in a first direction, and the pulses can have a second width when the wheel rotates in a second direction.

Autonomous driving applications can produce new requirements for wheel speed sensors. For example, a higher resolution may be necessary so as to enable autonomous parking applications.

SUMMARY

Apparatuses and methods which allow a relative movement direction of an encoder object to be determined would be desirable. In some examples, it may be desirable to be able to output information regarding the relative movement direction as soon as possible after a switch-on time.

Examples of the present disclosure provide an apparatus for determining a relative direction of a movement of an encoder object depending on a magnetic field which is generated or influenced by the encoder object, which apparatus has a magnetic field sensor and a processing circuit. The magnetic field sensor is designed in order to generate two sensor signals based on the magnetic field, which two sensor signals indicate a profile of the magnetic field in the event of a relative movement between the encoder object and the magnetic field sensor, fluctuate around a mean value and are phase-shifted through 90° in relation to one another. The processing circuit is designed in order to calculate an angle based on the two sensor signals, which angle is based on the arctangent of the quotient of the two sensor signals, and in order to determine the relative direction of the movement of the encoder object based on a gradient of the angle between a switch-on time of the apparatus and a first or second threshold value angle which is reached thereafter or based on a gradient of the angle between the situation of two successive threshold value angles being reached.

Examples of the present disclosure are based on the insight that the relative movement direction of the encoder object can be directly determined and therefore output when the gradient of the angle between a switch-on time of the apparatus and a first or second threshold value angle which is reached thereafter is used. As an alternative, the gradient of the angle between the situation of two successive threshold value angles being reached, for example the first and the second threshold value angle which is reached after the switch-on time, can be used. Therefore, examples of the present disclosure allow the movement direction to be output as quickly as possible, for example with a first pulse of an output signal which is output in accordance with a corresponding protocol.

Examples of the present disclosure provide a method for determining a relative direction of a movement of an encoder object depending on a magnetic field which is generated or influenced by the encoder object, in which method two sensor signals which are based on the magnetic field and which indicate a profile of the magnetic field in the event of a relative movement between the encoder object and the magnetic field sensor, fluctuate around a mean value and are phase-shifted through 90° in relation to one another are generated. An angle which is based on the arctangent of the quotient of the two sensor signals is calculated. The relative direction of the movement of the encoder object is determined based on a gradient of the angle between a switch-on time and a first or second threshold value angle which is reached thereafter or based on a gradient of the angle between the situation of two successive threshold value angles being reached.

BRIEF DESCRIPTION OF THE DRAWINGS

Examples of the present disclosure will be described below with reference to the appended drawings, in which.

DETAILED DESCRIPTION

Hereinafter, examples of the present disclosure will be described in detail below. It should be noted that identical elements or elements having the same functionality may be provided with identical or similar reference signs, with a repeated description of elements which are provided with the same or similar reference signs typically being omitted. Descriptions of elements which have identical or similar reference signs are mutually interchangeable. In the following description, many details will be described in order to yield a more thorough explanation of examples of the disclosure. However, it is evident to those of ordinary skill in the art that other examples can be implemented without these specific details. Features of the various examples described can be combined with one another, unless features of a corresponding combination are mutually exclusive or such a combination is expressly excluded.

Figure 1:
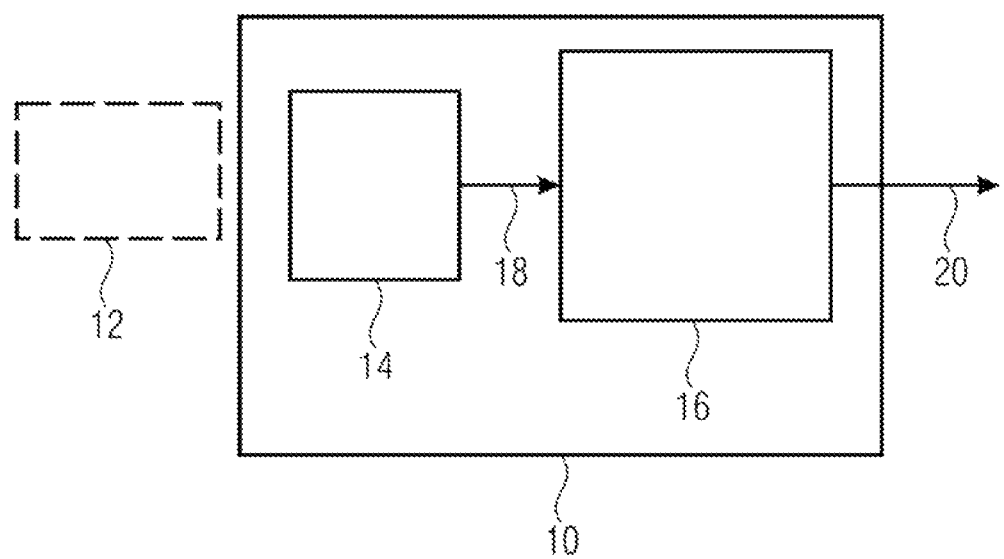
FIG. 1 shows a schematic illustration of an example of an apparatus for determining a relative movement direction.

FIG. 1 schematically shows an apparatus 10 for determining a relative direction of a movement of an encoder object 12 depending on a magnetic field which is generated or influenced by the encoder object 12. In this case, the encoder object 12 is illustrated using dashed lines in FIG. 1 since the encoder object 12 is not part of the apparatus in examples. The apparatus 10 has a magnetic field sensor 14 and a processing circuit 16. The magnetic field sensor 14 is designed in order to generate two sensor signals based on the magnetic field which is generated or influenced by the encoder object 12, which two sensor signals indicate a profile of the magnetic field in the event of a relative movement between the encoder object 12 and the magnetic field sensor 14, fluctuate around a mean value and are phase-shifted through 90° in relation to one another. The processing circuit 16 is coupled, for example connected by wires or in a wireless manner, to the magnetic field sensor 14 such that they can communicate, as shown by an arrow 18 in FIG. 1, and receives the two sensor signals. The processing circuit 16 calculates an angle based on the two sensor signals, which angle is based on the arctangent of the quotient of the two sensor signals. The processing circuit 16 further determines the relative direction of the movement of the encoder object based on a gradient of the angle between a switch-on time of the apparatus and a first or second threshold value angle which is reached thereafter or based on a gradient of the angle between the situation of two successive threshold value angles being reached. The apparatus 10 can be designed in order to output an output signal 20 which indicates the relative direction.

Figure 2:
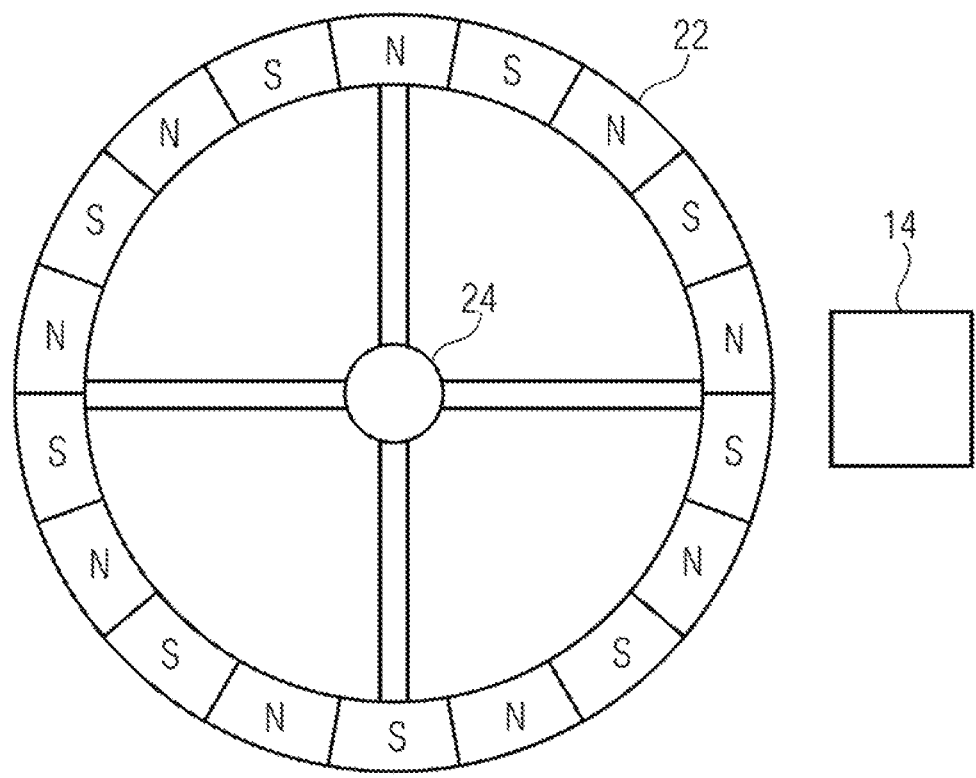
FIG. 2 schematically shows an arrangement of an apparatus for determining a relative movement direction and a pole wheel.

In examples, the magnetic field sensor 14 can be designed in order to generate the oscillation signal based on a rotation of a pole wheel 22, as is schematically illustrated in FIG. 2. In some examples, the encoder object may include the pole wheel 22. The pole wheel 22 can be rotatably mounted on a shaft 24. The pole wheel can have one pole pair or, as is schematically shown in FIG. 2, a plurality of pole pairs of magnetic north poles N and magnetic south poles S. The magnetic field sensor 14 is positioned relative to the pole wheel 22 in such a way that it generates the two sensor signals based on the magnetic field which varies on account of a rotation of the pole wheel 22, which sensor signals fluctuate around a mean value and are phase-shifted through 90° in relation to one another. In examples, the frequency of the oscillation signal can therefore be dependent on a rotational frequency, for example on the rotational frequency of a wheel which rotates with the shaft 24.

In other examples, the encoder object can be formed by an elongate magnetized strip which has a row of pole pairs. In other examples, the encoder object can have a gear wheel or a toothed rack composed of a ferromagnetic material, in each case together with a back-bias magnet, the magnetic field of which is influenced by a movement of the toothed rack or of the gear wheel.

In examples, the magnetic field sensor has in each case one or more AMR sensor elements (AMR=anisotropic magnetoresistance), GMR sensor elements (GMR=giant magnetoresistance), TMR sensor elements (TMR=tunnel magnetoresistance) or Hall sensor elements.

Figure 4:
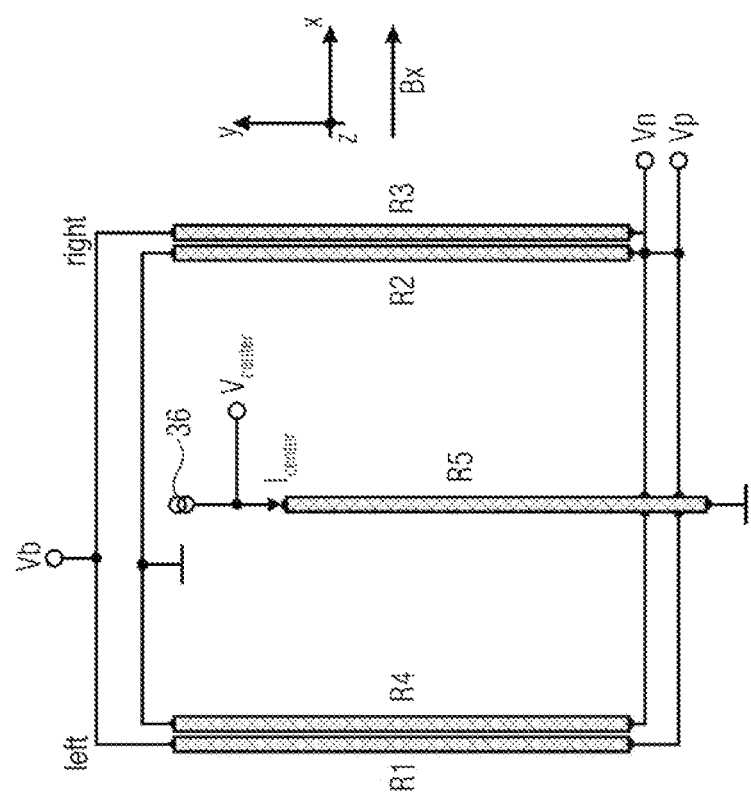
FIG. 4 shows a schematic illustration of a further example of a magnetic field sensor.
Figure 3:
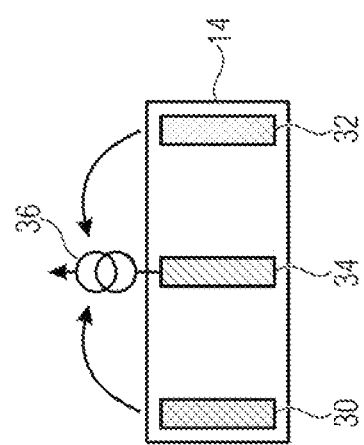
FIG. 3 shows a schematic illustration of an example of a magnetic field sensor.

In examples, the magnetic field sensor has at least one first sensor element with a first detection signal, a second sensor element with a second detection signal and a third sensor element with a third detection signal, wherein the third sensor element is arranged centrally between the first sensor element and the second sensor element, wherein the magnetic field sensor is designed in order to generate one of the two sensor signals based on a difference between the first and the second detection signal and to generate the other of the two sensor signals based on a difference between the sum of the first detection signal and the second detection signal and the third detection signal. Examples of magnetic field sensors of this kind are shown in FIGS. 3 and 4. FIG. 3 shows an example of the magnetic field sensor 14 with sensor elements 30, 32 and 34, wherein the sensor element 34 is arranged centrally between the sensor elements 30 and 32. A first sensor signal is generated based on a difference between the detection signals of the sensor elements 30 and 32. A second sensor signal is generated based on a difference between the sum of the detection signals of the sensor elements 30 and 32 and the detection signal of the sensor element 34. To this end, for example, the sensor element 34 can be fed with a current which originates from a bridge circuit, which has the sensor elements 30 and 32, as is indicated by a current source 36 in FIG. 3. The sensor elements 30, 32 and 34 can be arranged one behind the other in the movement direction relative to the encoder object, so that a phase shift between the two generated sensor signals is 90°.

An alternative example of a magnetic field sensor is schematically illustrated in FIG. 4. The example shown has two left-hand-side sensor elements R1, R4 and two right-hand-side sensor elements R2, R3 which are interconnected in a Wheatstone bridge configuration. The sensor elements can be formed, for example, by AMR sensor elements, TMR sensor elements or GMR sensor elements. A first sensor signal is obtained as the difference between the signals Vp–Vn of the bridge circuit. This first sensor signal is sometimes called the speed signal. A further sensor element, which can likewise be formed by an xMR element, is arranged centrally between the left-hand-side and right-hand-side sensor elements. This central sensor element R5 is fed by a current $I_{center}$ which is based on the sum of the bridge currents, as is once again indicated by a current source 36. Since the central sensor element R5 is fed by the current which originates from the bridge circuit of the outer sensor elements, a differential behavior is likewise achieved for the sensor signal $V_{center}$ of the central sensor element R5. This sensor signal is obtained as the voltage across the central sensor element R5 and is sometimes called the direction signal. Since the central sensor element R5 lies centrally between the left-hand-side and right-hand-side sensor elements in the movement direction, the phase shift between the two sensor signals is systematically 90°.

In the magnetic field sensors described with reference to FIGS. 3 and 4, the respective sensor elements are designed in order to detect a magnetic field component in one direction, for example the component Bx in FIG. 4. In other examples, the sensor signals which are phase-shifted through 90° can be generated in a different way. In examples, the magnetic field sensor can have a first sensor element, which is designed in order to detect a magnetic field component in a first direction and to generate one of the two sensor signals, and a second sensor element, which is designed in order to detect a magnetic field component in a second direction, which is perpendicular in relation to the first direction, and to generate the other of the two sensor signals.

In examples, the magnetic field sensor can be formed in any suitable manner in order to generate the sensor signals which are phase-shifted through 90° in relation to one another.

Figure 5:
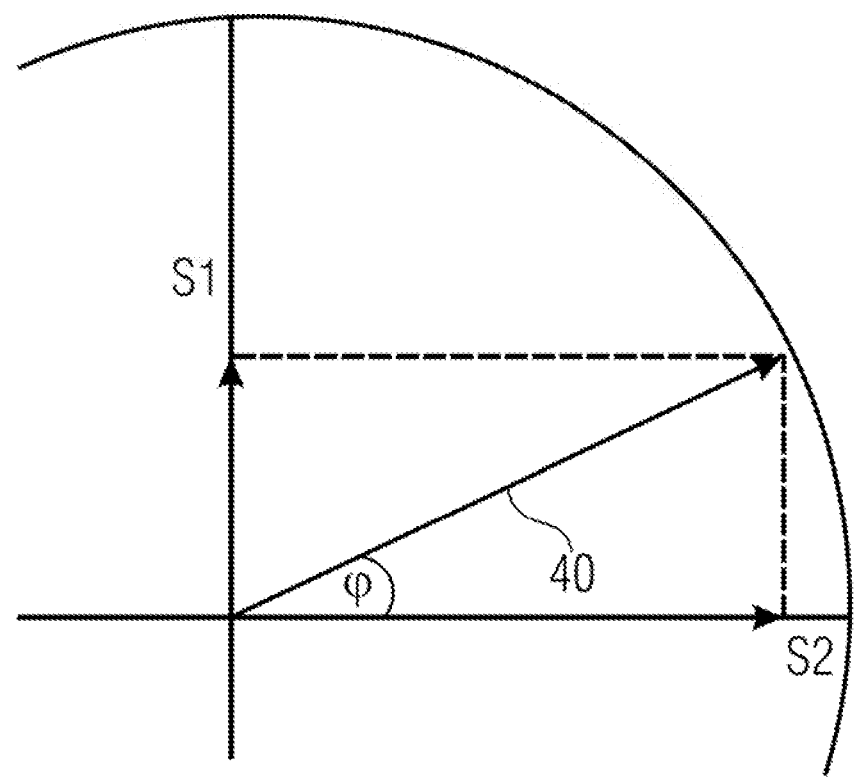
FIG. 5 shows a graph which shows a magnetic field vector.

In examples, the two sensor signals are sinusoidal signals which are phase-shifted through ±90° in relation to one another and can be considered to be cosine and sine components of a rotating vector. FIG. 5 schematically shows a coordinate system in which a first sensor signal S1 is plotted on the y-axis and a second sensor signal S2 is plotted on the x-axis. In this case, the vector 40 which is produced by respective sensor signals S1 and S2 is arranged at an angle $\varphi$ with respect to a reference axis, which can be the x-axis for example. In this case, the angle $\varphi$ is calculated based on the arctangent of the quotient of the two sensor signals as follows: $\varphi=\arctan(S1/S2)$. In examples of the present disclosure, the angle can be generated from the two sensor signals using the arctan function, the atan 2 function or the CORDIC algorithm. An angle which is based on the arctangent of the quotient of the two sensor signals is calculated by all of these functions.

Figure 6A:
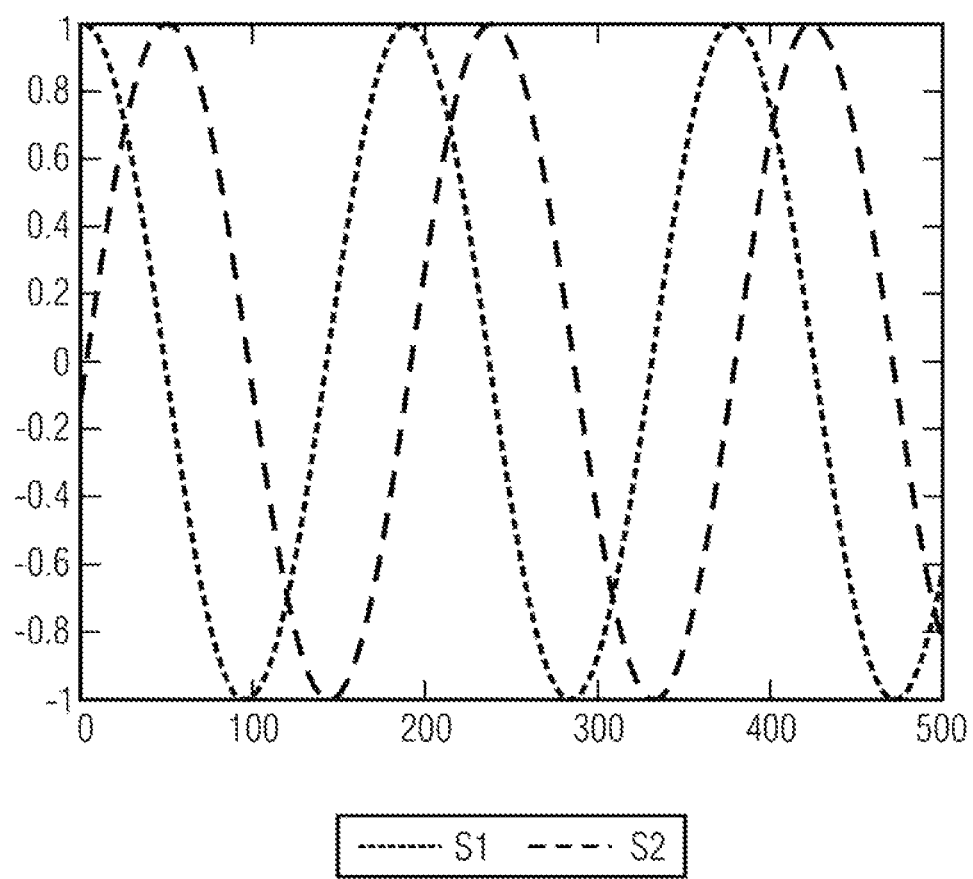
FIG. 6A and FIG. 6B show examples of in each case two sensor signals which are phase-shifted through 90°.
Figure 6B:
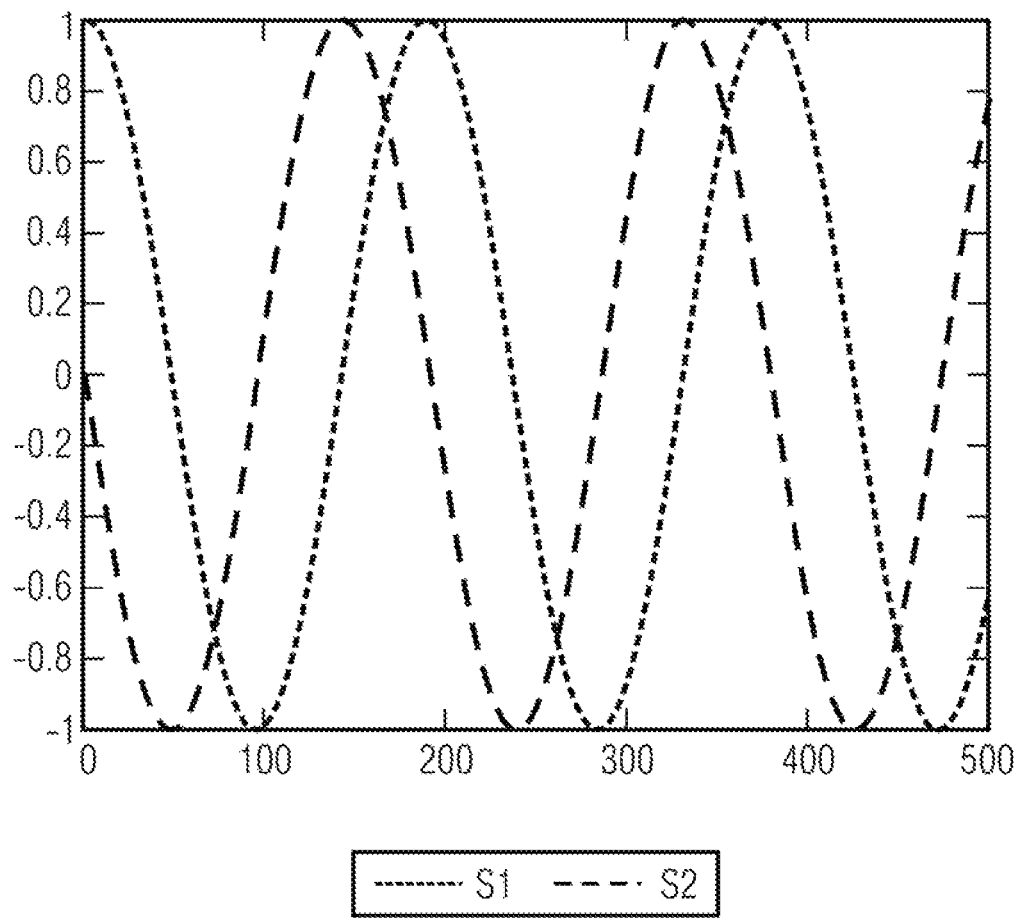

Therefore, the instantaneous phase of the rotating vector, the components of the rotating vector being the two sensor signals S1 and S2, is calculated. As has already been stated above, the two sensor signals are sometimes called the "speed" signal and the "direction" signal. FIGS. 6A and 6B show the first sensor signal S1 and the second sensor signal S2, which sensor signals are obtained in the event of a relative movement between the encoder object and the magnetic field sensor, for successive sampling values 0 to 500, that is to say over time. There is a phase shift of 90° between the signals S1 and S2 in each case. Depending on the movement direction, the signal S2 leads the signal S1, FIG. 6A, or the signal S1 leads the signal S2, FIG. 6B. The angle information which is obtained by the sensor signals S1 and S2 can therefore be used in order to determine a movement direction of an encoder object, for example a rotation direction of an encoder wheel. It has been found that this angle information can also be used in order to calculate the rotation direction during start-up or switch-on, and therefore to be able to immediately output a correct and valid item of direction information.

In examples, the instantaneous angle is calculated and stored during start-up or switch-on. In this case, the instantaneous angle is calculated on the basis of the sensor signals S1 and S2 at the time of switch-on, for example using one of the functions specified above. Depending on the sign of the gradient of the angle, that is to say depending on whether the gradient is positive or negative, it is possible to determine the movement direction, for example the rotation direction, starting from this instantaneous angle. In the case of a positive gradient, increase, the angle becomes greater, and in the event of a negative gradient, drop, the angle becomes smaller.

Figures 7A, 7B:
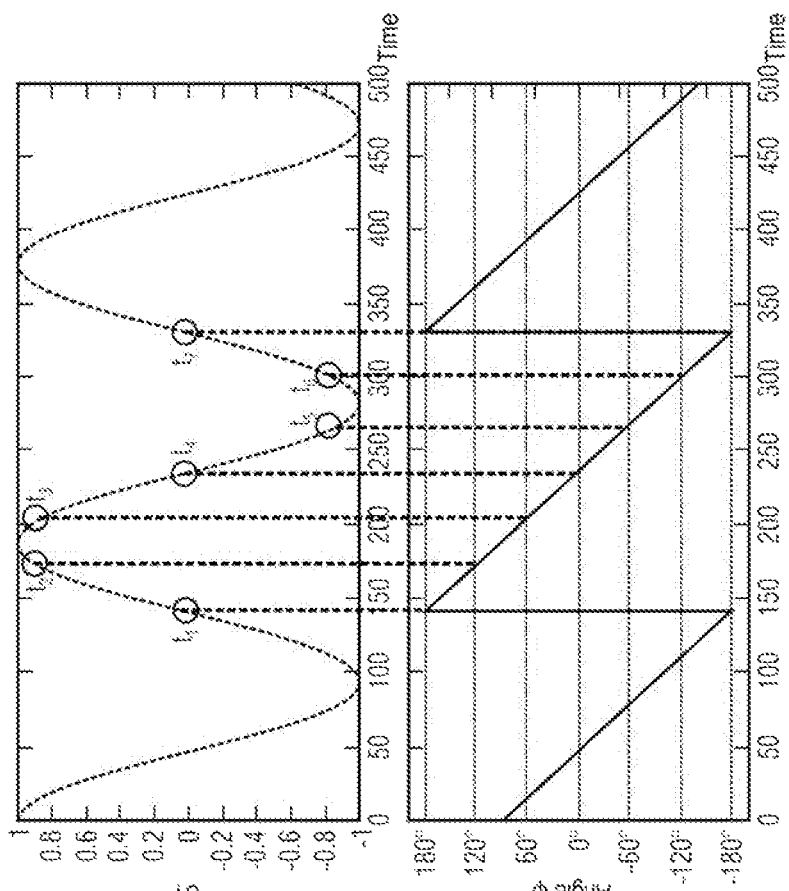
FIG. 7A shows an example of a sensor signal.
FIG. 7B shows an example of an angle which is calculated based on two sensor signals.

FIGS. 7A and 7B illustrate this using the sensor signal S1, FIG. 7A, and the corresponding angle $\varphi$, FIG. 7B. FIG. 7A shows six times $t_1$ to $t_6$ at which the angle $\varphi$ in each case reaches a limit value, specifically a limit value of −180° at a time $t_1$, a limit value of 120° at a time $t_2$, a limit value of 60° at a time $t_3$, a limit value of 0° at a time $t_4$, a limit value of −60° at a time $t_5$, and a limit value of −120° at a time $t_6$. The angle $\varphi$ once again reaches the limit value −180° at a time $t_7$. In examples, the angle $\varphi$ therefore changes monotonically over an angle range over one period of the sensor signals and is subdivided by a plurality of threshold value angles. In the example shown in FIG. 7B, the threshold value angles are at a distance of 60° from one another, so that the angle $\varphi$ reaches a threshold value angle every 60°. In other examples, the threshold value angles can be at a different distance from one another, for example 45° or 90°.

In examples, the apparatus can be designed in order to generate a respective pulse in the output signal, for example the output signal 20 of the apparatus 10 in FIG. 1, when the angle reaches one of the plurality of threshold value angles. Therefore, in the example shown in FIGS. 7A and 7B, a pulse would be generated in the output signal at each of the times $t_1$, $t_2$, $t_3$, $t_4$, $t_5$, $t_6$, and $t_7$.

In examples of the present disclosure, the processing circuit is designed in order to only generate a first of the pulses in the output signal after switch-on once the relative direction of the movement of the encoder object is determined, wherein the output signal respectively contains, together with the at least one pulse, information relating to the relative direction of the movement of the encoder object. Therefore, examples of the present disclosure allow information relating to the movement direction to be output to an external unit, for example an electronic control unit, directly with the first pulse after switch-on. In examples of the present disclosure, the processing circuit is designed in order to output the output signal in accordance with a signal protocol. In example implementations, the signal protocol is a so-called AK protocol in which a plurality of pulses are always output when the angle reaches the threshold value angle, a first of the pulses with a first pulse height indicating the situation of the threshold value angle being reached and subsequent pulses of the pulses with a second lower pulse height representing information bits which can indicate further information, for example the movement direction. In example implementations, the processing circuit is designed in order to output the output signal in accordance with a PWM protocol in which in each case an individual pulse is generated in the output signal when the angle reaches a threshold value angle. The processing circuit can be designed in order to modulate the width of the pulse in order to include information relating to the movement direction. For example, the pulse can have a first width when a movement in a first direction takes place, and the pulses can have a second width when a movement in a second direction takes place.

Figure 8A:
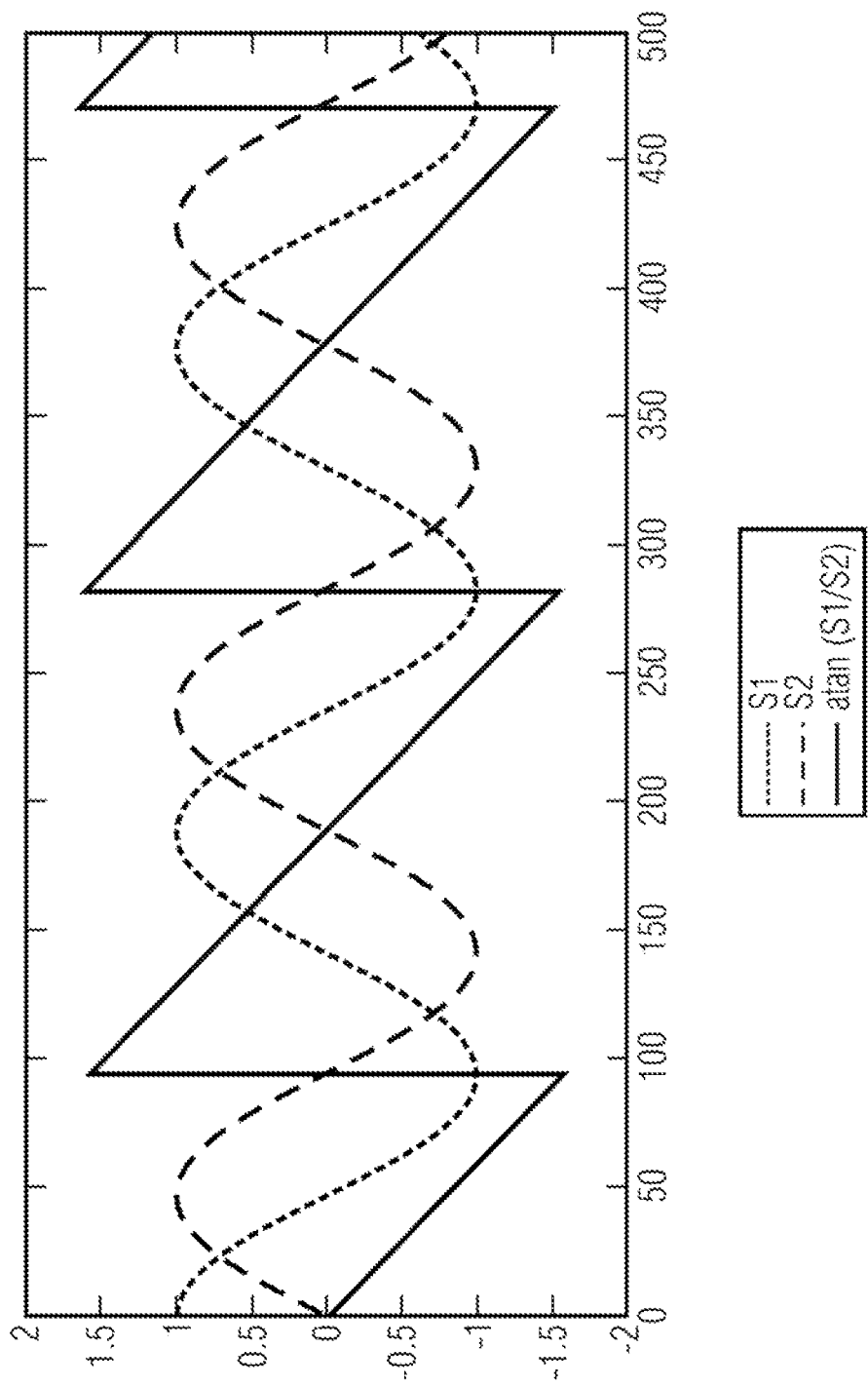
FIG. 8A and FIG. 8B schematically show corresponding sensor signals and a corresponding angle for a movement in the forward direction, FIG. 8A, and corresponding sensor signals and a corresponding angle for a movement in the backward direction, FIG. 8B.
Figure 8B:
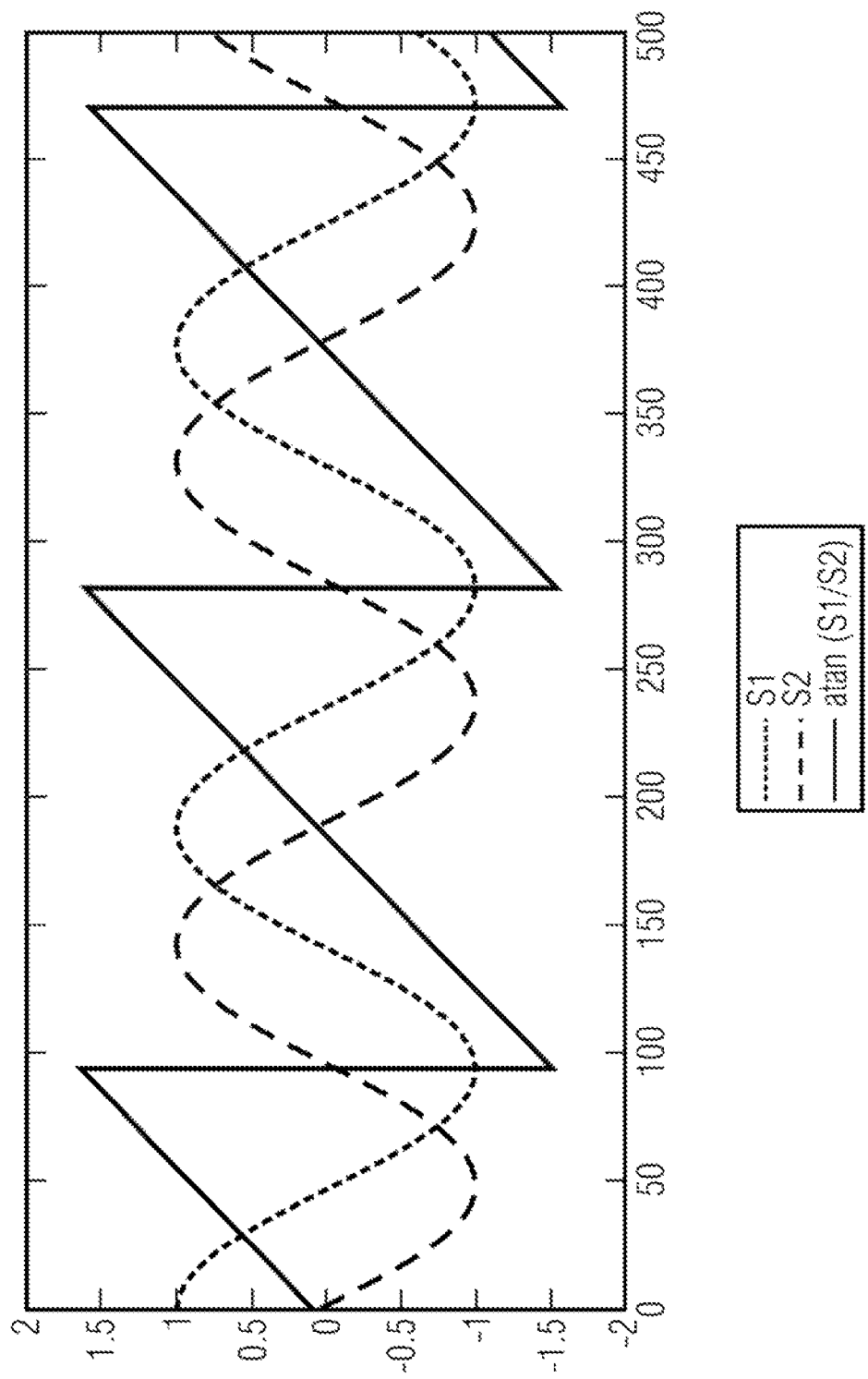

FIG. 8A schematically shows the sensor signals S1 and S2 and the angle=atan (S1/S2) for a movement in the forward direction, and FIG. 8B shows the sensor signals S1 and S2 and also the angle φ for a movement in the backward direction. As can be gathered from FIG. 8A, the gradient of the angle is negative for a movement in a first direction (forward direction), while the gradient is positive for a movement in a second direction (backward direction). Therefore, the movement direction can be determined by determining this gradient.

Figure 9A:
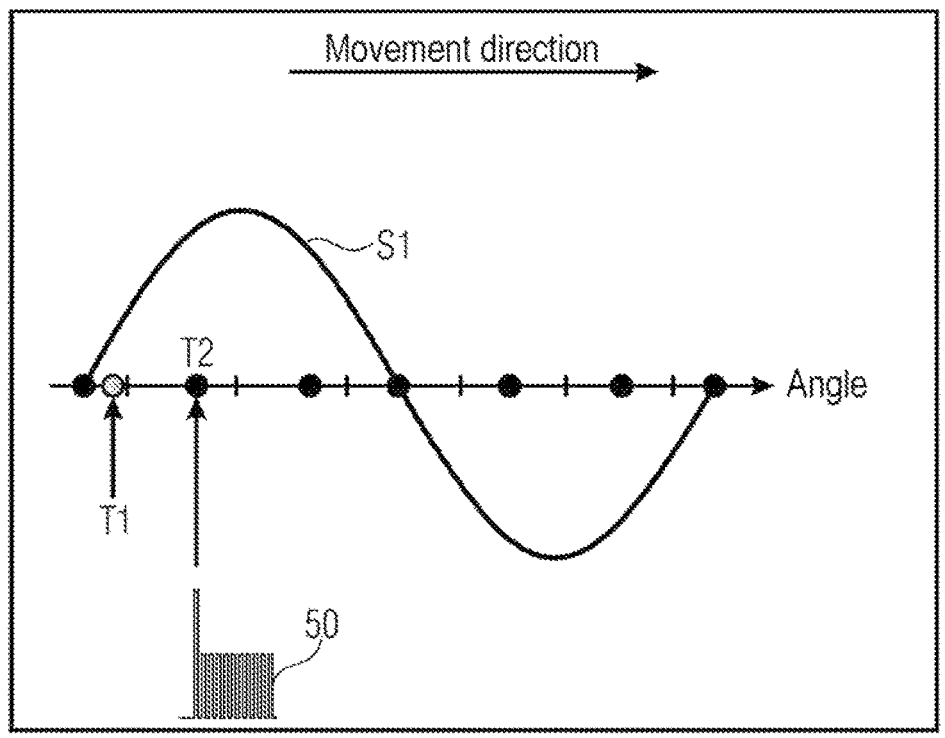
FIG. 9A and FIG. 9B show schematic graphs which show examples of a sensor signal, of a switch-on time and of a first output pulse.

In examples, the movement direction is determined based on a gradient of the angle between a switch-on time and a first threshold value angle which is reached thereafter. In order to be able to reliably determine the gradient and therefore determine the movement direction, a distinction can be drawn between two cases in examples of the disclosure. FIG. 9A shows a case in which the relative direction of the movement of the encoder object is determined based on the gradient of the angle between the switch-on time of the apparatus and the first threshold value angle which is reached thereafter. FIG. 9A shows one period of the sensor signal S1. A time T1 represents a start time at which, for example, the apparatus is switched on or started up. A time T2 represents a time at which the angle φ reaches the first threshold value angle after the switch-on time T1. In this case, the distance between the switch-on time T1 and the situation of the first threshold value angle being reached at time T2 is large enough, so that a difference between the angle at the switch-on time and the first threshold value angle is greater than or equal to a predetermined difference, so that correct calculation of the direction can be achieved with a sufficient degree of reliability. Therefore, a first output pulse is generated in the output signal when the first threshold value angle is reached at time T2, as is shown by a corresponding pulse sequence 50 in FIG. 9A. In examples, the processing circuit is therefore designed in order to determine the relative direction of the movement of the encoder object based on the gradient of the angle between the switch-on time of the apparatus and the first threshold value angle which is reached thereafter and to generate a pulse in an output signal when a difference between the angle at the switch-on time and the first threshold value angle is greater than or equal to a predetermined difference.

Figure 9B:
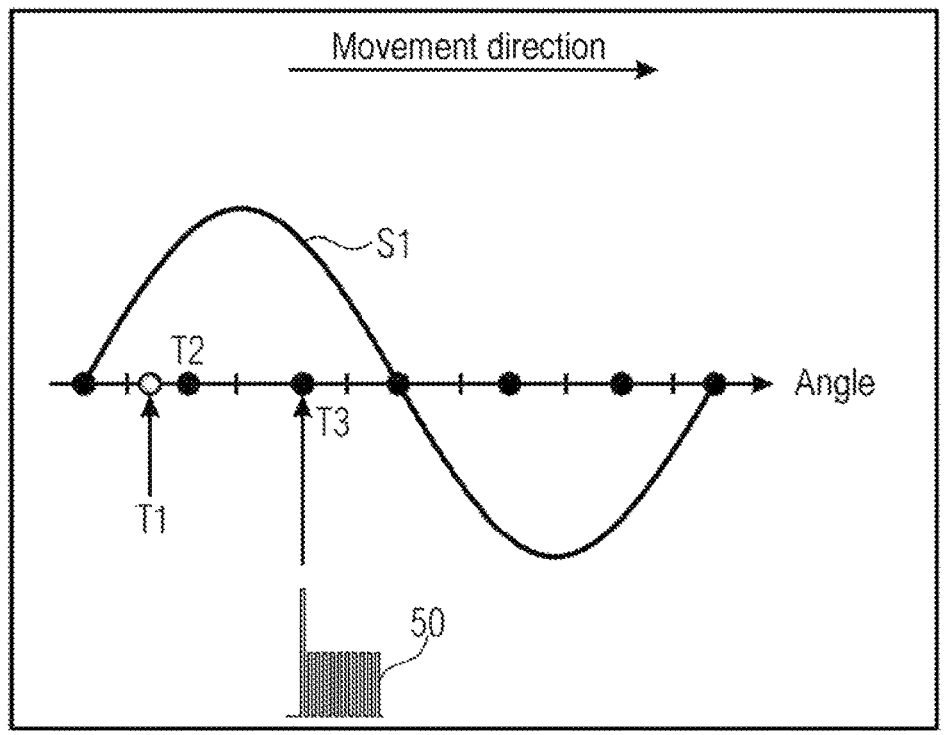

FIG. 9B shows a second case in which a difference between the start time T1 and the time T2 at which the angle φ reaches a second threshold is not large enough, so that the difference between the calculated angle at the start time T1 and the first threshold value angle at time T2 is smaller than the predetermined difference. Therefore, the difference is too small to correctly calculate the direction in a reliable manner. In this case, the apparatus is designed in order to determine the movement direction based on the gradient of the angle between the start time T1 and the second threshold value angle which is reached thereafter at time T3. The processing circuit is designed in order to generate the first pulse in the output signal only at this time, as is shown by the pulse sequence 50 in FIG. 9B. Therefore, the first pulse is only generated when the angle reaches the second threshold value angle after the start time. In examples, the processing circuit could be designed in order to, in the case of FIG. 9B, determine the gradient of the angle between the first threshold value angle which is reached after the start time and the second threshold value angle which is reached after the start time.

In examples, the processing circuit is therefore designed in order to determine the relative direction of the movement of the encoder object based on the gradient of the angle between the switch-on time of the apparatus and the second threshold value angle which is reached thereafter or based on the gradient of the angle between the first threshold value angle which is reached thereafter and the second threshold value angle which is reached thereafter and to output a first pulse in the output signal only when the second threshold value angle is reached when a difference between the angle at the switch-on time and the first threshold value angle is smaller than the predetermined difference.

Example implementations therefore allow direction detection which is robust to noise and oscillations and allows correct and valid direction detection even when noise and oscillations are present.

In example implementations, the predetermined difference can lie in the center between the threshold value angles. This allows reliable detection even in the case of low signal-to-noise ratios. However, this "safety margin" can also be reduced if the signal-to-noise ratio allows. For example, the predetermined difference can be set to a value of less than 50% of the distance between two threshold value angles, for example to 25%. This produces a minimum value and a maximum value in respect of the magnetic signal, depending on which the gradient is determined and therefore the first pulse is generated in the output signal. In both cases, the direction can be identified as valid and correct at the first pulse in the output signal.

Figure 10:
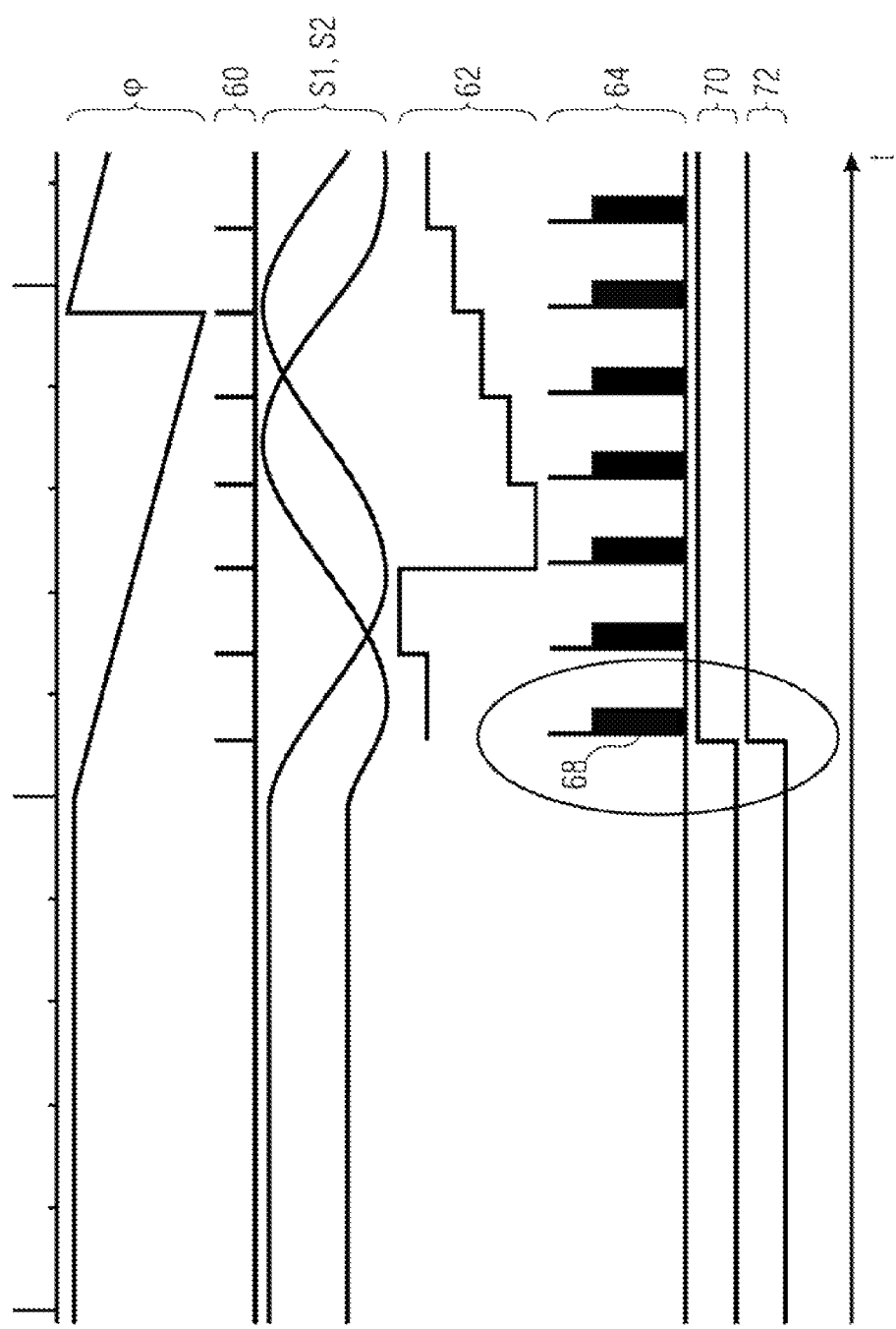
FIG. 10 shows schematic signal profiles of sensor signals and signals derived therefrom.

FIG. 10 schematically shows the sensor signals S1 and S2 and also signals and variables derived from the sensor signals. Therefore, FIG. 10 shows the angle φ which is calculated from the sensor signals and also a signal 60 which has a respective pulse when the angle reaches one of the threshold value angles. FIG. 10 shows, at 62, an encoded version of the angle φ and, at 64, the output signal which is output in accordance with the signal protocol. A first pulse 68 in the output signal 64 is generated when the movement direction has been correctly and reliably identified. In the example shown, the output protocol has a first pulse 68 with a first pulse height and further pulses with a second pulse height, which pulses represent information bits and are illustrated as a block in FIG. 10 for reasons of simplicity. A signal 70 in FIG. 10 indicates the rotation direction, wherein this signal can assume, for example, a value of 0 or 1, depending on the rotation direction. A signal 72 indicates whether the rotation direction is valid, wherein this signal 72 can have, for example, a value of 1 when the rotation direction detection is valid.

In example implementations, a first pulse in the output signal is thus discarded, that is to say not generated, after switch-on of the apparatus if, at the time at which the pulse would have been generated, the movement direction was detected as not valid since, for example, the difference between the angle at the switch-on time and the first threshold value angle which is reached thereafter is too small.

If the start time is too close to the time at which the angle reaches the threshold value angle, in the case of which a jump in the angle occurs, it is possible to wait for the following threshold value angle to be reached, in the example shown −120° or +120° if the angle lies in a range of from −180° to +180°. In this case, the processing circuit can be designed in order to identify that the −180° or +180° threshold has been passed, and to take this into account when determining the gradient of the angle.

It is assumed, for example, that the start time is at −160° in the example shown in FIG. 7B. Therefore, the difference from the next threshold value angle is merely −20°, this being smaller than the predetermined difference, so that the next-but-one threshold value angle is taken into account for determining the gradient. The difference between the next-but-one threshold value angle, which is 120°, and the start time is then 280°. The processing circuit can identify that this angle is greater than 180°, which means that a jump from −180° to 180° has taken place between the start time and the situation of the next-but-one threshold value angle being reached, and in this case subtract 360° from the result. Therefore, a difference of −80° is produced, this indicating a falling gradient.

In the same way, a jump from +180° to −180° can be taken into account in the case of a positive gradient. It is assumed, for example, in FIG. 8A that the start time is at 160°, so that the difference from the next threshold value angle reached is smaller than the predetermined difference. Therefore, the next-but-one threshold value angle is used for determining the gradient. This follows the jump and is −120°. The difference between the next-but-one threshold value angle and the angle at the start time is therefore −280°. The processing circuit can once again identify that this angle is smaller than −180° and in this case add 360° to the result. This produces a difference of +80°, this corresponding to a positive gradient.

Therefore, the movement direction can be reliably identified even when a jump occurs between the angles which are used for determining the gradient.

Figure 11:
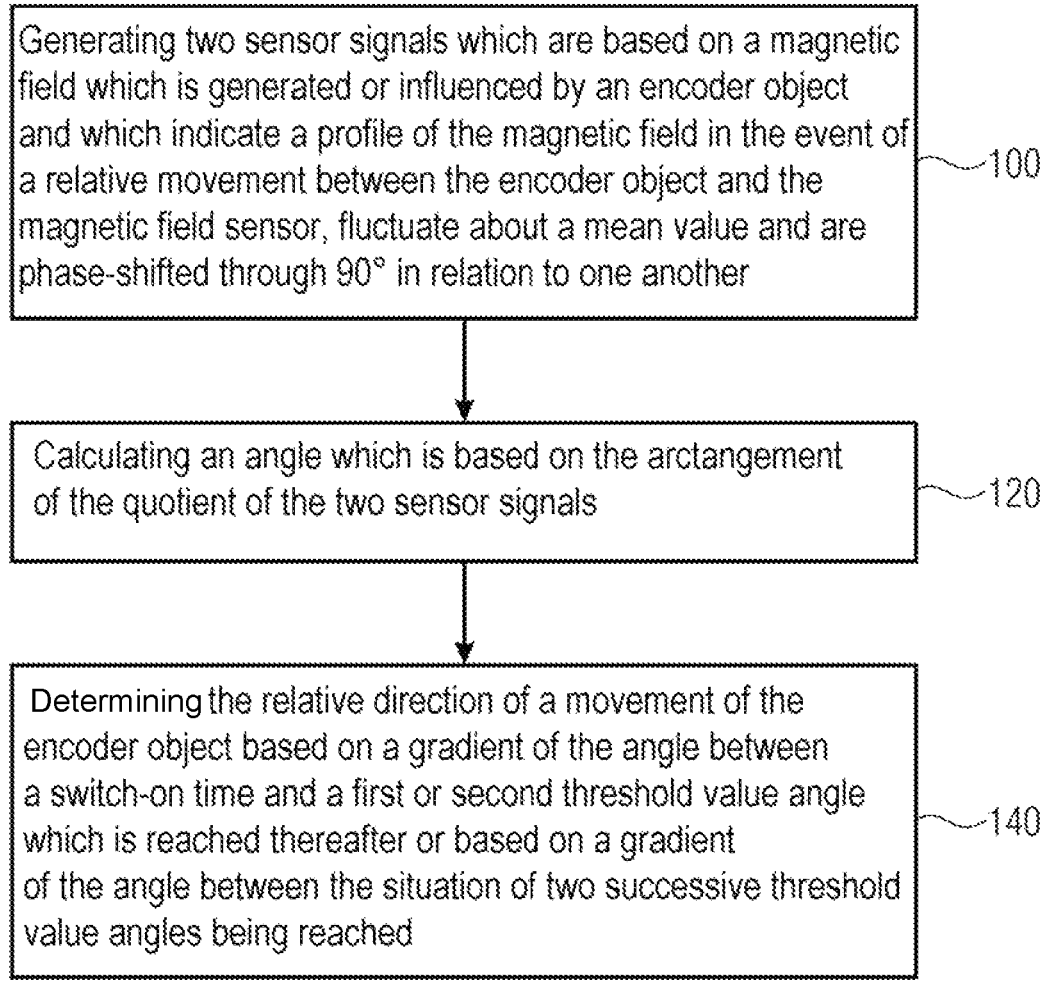
FIG. 11 shows a schematic illustration of an example of a method for determining a relative movement direction.

FIG. 11 schematically shows a flowchart of an example of a method according to the present disclosure. At 100, two sensor signals which are based on a magnetic field which is generated or influenced by an encoder object and which indicate a profile of the magnetic field in the event of a relative movement between the encoder object and the magnetic field sensor, fluctuate around a mean value and are phase-shifted through 90° in relation to one another are produced. In examples of the disclosure, the two sensor signals are a cosine signal and a sine signal. At 120, an angle which is based on the arctangent of the quotient of the two sensor signals is calculated. At 140, the relative direction of a movement of the encoder object is determined based on a gradient of the angle between a switch-on time and a first or second threshold value angle which is reached thereafter or based on a gradient of the angle between the situation of two successive threshold value angles being reached.

Examples of the present disclosure provide a wheel speed sensor which has an apparatus for determining a relative direction of a movement of an encoder object, as is described in this document. The wheel speed sensor can be designed in order to output an output signal in accordance with a signal protocol in which a respective pulse is output when the angle reaches a threshold value angle. The wheel speed sensor can be coupled, for example connected by wires or in a wireless manner, to an external control unit (ECU) such that they can communicate, wherein the electronic control unit can determine the rotation speed and the rotation direction on the basis of the output signal. Example implementations of the disclosure allow the electronic control unit to be able to determine the rotation direction immediately when the first pulse in the output signal is received, this being useful particularly for autonomous parking applications and start/stop scenarios in autonomous driving applications. Therefore, in examples of the disclosure, an item of information relating to the change in the calculated angle between the starting instant and the instant at which the angle crosses one of the defined threshold value angles is determined. This information can be used in order to extract the rotation direction and to communicate the rotation direction to the outside directly with the first output pulse.

In examples of the present disclosure, the processing circuit can be implemented by any suitable circuit structures, for example microprocessor circuits, ASIC circuits, CMOS circuits and the like. In examples, the processing circuit can be implemented as a combination of hardware structures and machine-readable instructions. By way of example, the processing circuit can comprise a processor and storage devices which store machine-readable instructions which result in methods described in this document being carried out when the machine-readable instructions are executed by the processor.

Although some aspects of the present disclosure have been described as features in association with an apparatus, it is clear that a description of this kind can likewise be considered a description of corresponding method features. Although some aspects have been described as features in association with a method, it is clear that a description of this kind can also be considered a description of corresponding features of an apparatus or of the functionality of an apparatus.

The disclosure above provides illustrations and descriptions but is not intended to be exhaustive or restrict the implementations to the disclosed precise form. Modifications and variations are possible in light of the above disclosure or can be obtained from practice of the implementations. Even though certain combinations of features are cited in the patent claims and/or disclosed in the description, these features are not intended to limit the disclosure of possible implementations. In fact, many of these features may be combined in ways not specifically cited in the patent claims and/or disclosed in the description. Although each of the dependent patent claims cited below may directly depend only on one patent claim or some patent claims, the disclosure of possible implementations includes each dependent patent claim in combination with all other patent claims in the set of patent claims.

The examples described above merely illustrate the principles of the present disclosure. It should be understood that modifications and variations of the arrangements and of the details which are described are obvious to those skilled in the art. Therefore, the disclosure is intended to be limited only by the appended patent claims and not by the specific details which are presented for the purpose of describing and explaining the examples.

The invention claimed is:

1. An apparatus for determining a relative direction of a movement of an encoder object depending on a magnetic field which is generated or influenced by the encoder object, the apparatus comprising:

a magnetic field sensor which is designed to generate two sensor signals based on the magnetic field, wherein the two sensor signals indicate a profile of the magnetic field in an event of a relative movement between the encoder object and the magnetic field sensor, fluctuate around a mean value, and are phase-shifted through 90° in relation to one another; and a processing circuit which is designed:
to calculate an angle based on the two sensor signals, wherein the angle is based on an arctangent of a quotient of the two sensor signals, and
to determine the relative direction of the movement of the encoder object based on a gradient of the angle between a switch-on time of the apparatus and a threshold value angle.

2. The apparatus as claimed in claim 1, wherein the threshold value angle is reached when a difference between the angle at the switch-on time and the threshold value angle is greater than or equal to a predetermined difference.

3. The apparatus as claimed in claim 2, wherein the threshold value angle is a first threshold value angle,
wherein the processing circuit is designed to determine the relative direction of the movement of the encoder object based on the gradient of the angle between the switch-on time of the apparatus and a second threshold value angle which is reached thereafter or based on the gradient of the angle between the first threshold value angle which is reached thereafter and the second threshold value angle which is reached thereafter when a difference between the angle at the switch-on time and the first threshold value angle is smaller than the predetermined difference.

4. The apparatus as claimed in claim 1, wherein the processing circuit is designed to generate an output signal, which has in each case at least one pulse, when the angle reaches one of a plurality of threshold value angles that include the threshold value angle,
wherein a first pulse of the pulses in the output signal is generated after switch-on once the relative direction of the movement of the encoder object is determined, and
wherein the output signal contains, together with the at least one pulse, information relating to the relative direction of the movement of the encoder object.

5. The apparatus as claimed in claim 4, wherein the output signal contains, together with the at least one pulse, an information bit which indicates the relative direction, or in which a width of the at least one pulse is modulated in order to indicate the relative direction.

6. The apparatus as claimed in claim 1, wherein the magnetic field sensor has at least one first sensor element with a first detection signal, a second sensor element with a second detection signal, and a third sensor element with a third detection signal, wherein the third sensor element is arranged centrally between the first sensor element and the second sensor element, and
wherein the magnetic field sensor is designed to generate one of the two sensor signals based on a difference between the first detection signal and the second detection signal and to generate the other of the two sensor signals based on a difference between a sum of the first detection signal, the second detection signal, and the third detection signal.

7. The apparatus as claimed in claim 1, wherein the magnetic field sensor has a first sensor element, which is designed to detect a magnetic field component in a first direction and to generate one of the two sensor signals, and a second sensor element, which is designed to detect a magnetic field component in a second direction, which is perpendicular in relation to the first direction, and to generate the other of the two sensor signals.

8. The apparatus as claimed in claim 1, wherein the angle changes monotonically over an angle range over one period of the sensor signals and is subdivided by a plurality of threshold value angles that include the threshold value angle.

9. A wheel speed sensor comprising the apparatus as claimed in claim 1 and the encoder object, wherein the encoder object has a pole wheel or a gear wheel composed of a ferromagnetic material.

10. A method for determining a relative direction of a movement of an encoder object depending on a magnetic field which is generated or influenced by the encoder object, the method comprising:
generating two sensor signals which are based on the magnetic field and which indicate a profile of the magnetic field in an event of a relative movement between the encoder object and a magnetic field sensor, fluctuate around a mean value, and are phase-shifted through 90° in relation to one another;
calculating an angle which is based on an arctangent of a quotient of the two sensor signals; and
determining the relative direction of the movement of the encoder object based on a gradient of the angle between a switch-on time and a threshold value angle.

11. The method as claimed in claim 10, wherein the threshold value angle is reached when a difference between the angle at the switch-on time and the threshold value angle is greater than or equal to a predetermined difference.

12. The method as claimed in claim 11, wherein the threshold value angle is a first threshold value angle,
wherein the relative direction of the movement of the encoder object is determined based on the gradient of the angle between the switch-on time of an apparatus and a second threshold value angle which is reached thereafter or based on the gradient of the angle between the first threshold value angle which is reached thereafter and the second threshold value angle which is reached thereafter when a difference between the angle at the switch-on time and the first threshold value angle is smaller than the predetermined difference.

13. The method as claimed in claim 11, wherein the angle changes monotonically over an angle range over one period of the sensor signals, and
wherein the angle range is subdivided by a plurality of threshold value angles that include the threshold value angle.

14. The method as claimed in claim 10, further comprising generating an output signal, which has in each case at least one pulse, when the angle reaches one of a plurality of threshold value angles that include the threshold value angle,
wherein a first pulse of the pulses is generated in the output signal after switch-on once the relative direction of the movement of the encoder object is determined, and
wherein the output signal respectively contains, together with the at least one pulse, information relating to the relative direction of the movement of the encoder object.

15. The method as claimed in claim 14, wherein the output signal contains, together with the at least one pulse, an information bit which indicates the relative direction, or in which a width of the at least one pulse is modulated in order to indicate the relative direction.

16. The method as claimed in claim 10, wherein the two sensor signals are generated using a first sensor element with a first detection signal, a second sensor element with a second detection signal, and a third sensor element with a third detection signal,
- wherein the third sensor element is arranged centrally between the first sensor element and the second sensor element,
- wherein one of the two sensor signals is generated based on a difference between the first detection signal and the second detection signal, and
- wherein the other of the two sensor signals is generated based on a difference between a sum of the first detection signal, the second detection signal, and the third detection signal.

17. The method as claimed in claim 10, wherein one of the two sensor signals is produced using a first sensor element which is designed to detect a magnetic field component in a first direction, and
- wherein the other of the two sensor signals is generated using a second sensor element which is designed to detect a magnetic field component in a second direction which is perpendicular in relation to the first direction.

\* \* \* \* \*